May 13, 1969 J. V. MULCAHY 3,444,347
METHOD FOR SOLDER REFLOW CONNECTION OF INSULATED CONDUCTORS
Filed Jan. 10, 1966
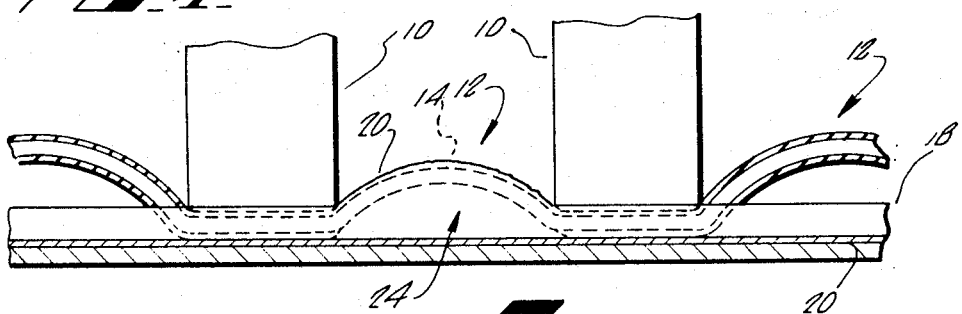
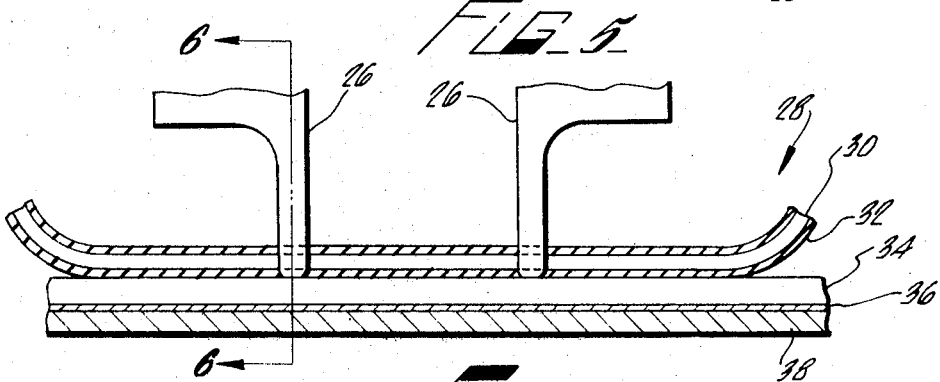
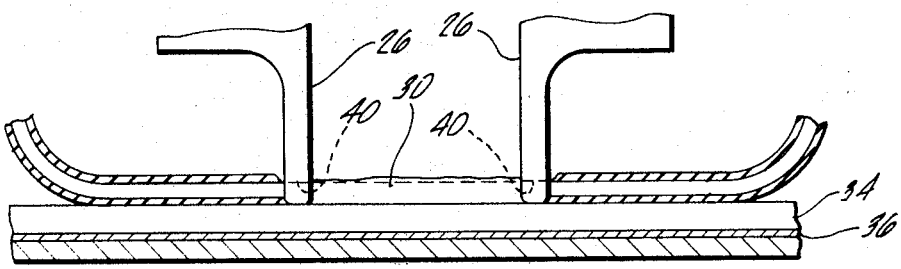
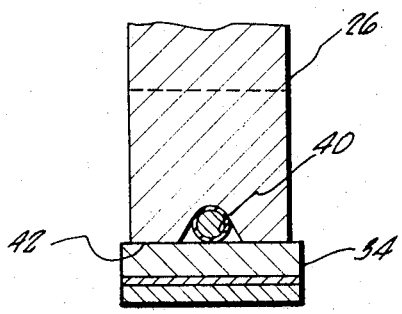
INVENTOR.
JOHN V. MULCAHY
BY
Christie, Parker & Hale
ATTORNEYS.

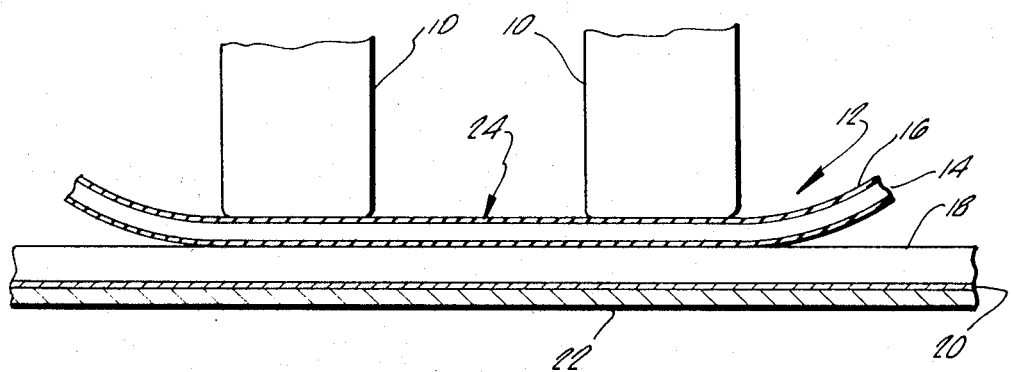
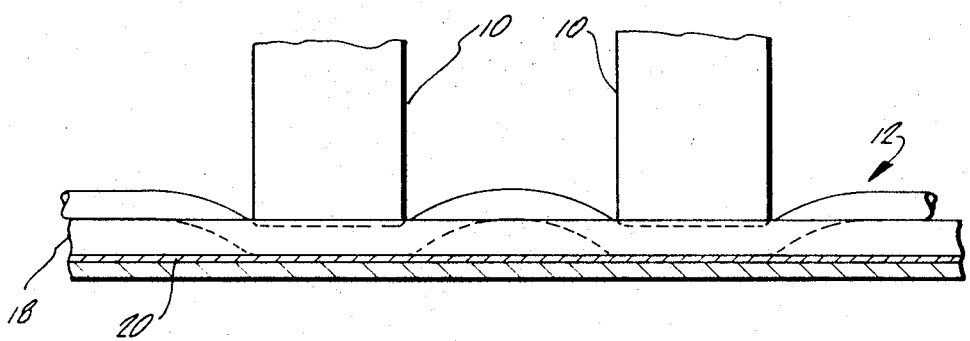
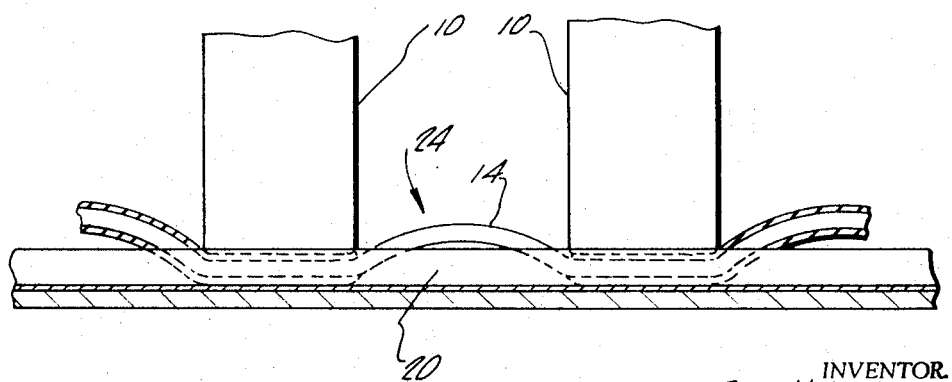

United States Patent Office 3,444,347
Patented May 13, 1969

3,444,347
METHOD FOR SOLDER REFLOW CONNECTION OF INSULATED CONDUCTORS
John V. Mulcahy, Temple City, Calif., assignor to Unitek Corporation, Monrovia, Calif., a corporation of California
Filed Jan. 10, 1966, Ser. No. 519,763
Int. Cl. B23k 1/02
U.S. Cl. 219—85          8 Claims

ABSTRACT OF THE DISCLOSURE

A method of reflow soldering of insulated conductors to portions of a workpiece to which the conductor is to be bonded. The method provides the steps of contacting the insulated conductor to the portion of the workpiece to which it is to be bonded with parallel gap welding electrodes. Thereafter pressure is exerted on the conductor by the electrodes and heat is supplied thereto to vaporize the insulation and cause the solder to melt and reflow over the now bared portion of the conductor. The electrical connection is completed by removing the electrodes from the workpiece and allowing the solder to solidify.

---

This invention relates to a method of making solder connections to an insulated conductor and in particular to a method of soldering such a conductor to a printed circuit board by means of parallel gap welding electrodes.

The method of this invention has application to the well-known technique of joining two or more pieces or strands of material, one or both of which has been "pretinned" with solder at some time prior to the joining operation. In this technique the joining or soldering is accomplished by applying heat to the pieces to be joined by means of a soldering iron or the like without the further application of solder at the time of joinder. The point of joining or attachment of the pieces is normally also the point of pretinning in order that there be a sufficient supply of solder for the joining operation.

The advantage of such a technique is that it eliminates a concurrent step in a soldered connection operation, viz., the need to supply solder from a separate source at the time of application of heat. Whether the connection is done automatically or by hand, the connection step is greatly simplified since, in effect, the operation is broken down into two distinct steps with the resultant ability to concentrate on each facet of the operation separately.

This is especially important in hand soldering operations since a certain amount of manual dexterity is involved in obtaining a solder connection when the heat and solder are applied simultaneously. Application of the solder via pretinning and subsequent heating to complete the connection makes the operation easier and more efficient without any degradation of the finished connection.

Among other applications for this technique is the connection of wire leads to various circuit points on a printed circuit board. In this application the conductive foil on the circuit board is overlaid with a pretinning quantity of solder. To complete the connection the wire lead is brought into contact with the solder and heat applied to the point of contact melting the solder and causing it to flow around the wire. Removal of the source of heat allows the solder to congeal completing the connection.

At the present time an additional preliminary step is required in many instances in order to perform the joining application just described. In these instances, the conductor to be joined to the printed circuit board is an insulated wire and the insulation must be removed before the soldering operation can be undertaken. The additional manipulative step of stripping insulation from the conductor to expose the metallic conductor is obviously a factor in the efficiency of such an operation and elimination of this step or its combination with other steps in the connection process to make this operation simultaneous with other steps in this process is desirable.

The present invention provides a method and apparatus for accomplishing this result. The method comprises the following steps. The portion of the insulated conductor to be soldered is placed in contact with a point of attachment. The point of attachment has previously been provided with a quantity of solder disposed on it, i.e., it has been pretinned. The wire and point of attachment are then contacted by a pair of spaced electrodes. The orientation of the electrodes is such that each of the electrodes is spaced along the conductor on opposite sides of the point of attachment, i.e., the electrodes are brought into contact with the wire and solder such that the pretinned point of attachment is located between the electrodes. Contact between the electrodes and the solder establishes an electric circuit therebetween. Electric power is then applied to the electrodes causing a flow of electric current in the circuit to heat and melt the solder and vaporize the insulation between the electrodes. The molten solder then flows over the conductor to make the reflow connection. Subsequently the power is discontinued and the electrodes removed from adjacent the point of attachment leaving the conductor soldered to the point of attachment.

Such a method is especially adapted for use with welding machines such as are used in bonding integrated circuit components, called flat packs, to printed circuit boards. The use of welding machines greatly simplifies the joinder of small diameter insulated conductors to the metal foil leads of printed circuits. Conductors of this size are widely used in wiring the matrices of computer memories. The electrodes provide a means for maintaining positive contact between the insulated wire and the point of attachment during the soldering operation. At the same time the delicate operation of mechanically stripping insulation from such fine wires with the high probability of breaking or damaging the conductors is largely eliminated.

In one specific approach to the method of this invention the wire to be soldered is laid on the predeposited quantity of solder at the point of attachment. This assembly has been prepositioned on the work table of a welding machine beneath a pair of parallel gap electrodes. The electrodes are then lowered into contact with the wire to pin it into contact with the solder. In this approach the quantity of solder predeposited has a thickness in excess of the diameter of the wire to be soldered. The wire is forced into the unmelted solder by the physical pressure of the electrodes until the bottom surfaces of the electrodes contact the solder. The remaining steps of the soldering operation proceed as above.

In a second and preferred approach, the bottom faces of the electrodes have a collinear groove or detent which is adapted to straddle the insulated wire to be connected such that the electrodes contact both the predeposited solder and wire when the electrodes are lowered to the point of attachment. In this approach the necessity of physically forcing the wire into a solder deposit is eliminated and smaller thicknesses of solder may be used. Again, the remaining steps of the soldering operation proceed as above.

Such a technique is readily adaptable to production-line use providing an efficient, positive way of securing insulated conductors to points of connection on such pieces of electrical apparatus as printed circuit boards by means of soldered connections. Connections of this type are frequently more desirable than welded connections especially where the removal and reconnection of the lead after repair is important. In welded connections, the lead is permanently fused to the point of connection and subsequent removal of the same length of lead is impossible. A stub which is frequently too short to be of practical value is the usual result. With soldered connections, however, the soft solder readily yields under pressure freeing the lead which it secures enabling disconnection of the original length of lead and subsequent reconnection when desired.

These and other features of the method of the invention will be more clearly understood by reference to the following figures in which:

FIG. 1 is an elevational view of a pair of parallel gap electrodes in contact with an insulated wire disposed on a pretinned printed circuit board;

FIG. 2 is a view of the arrangement of FIG. 1 after electrode pressure has been exerted on the insulated wire;

FIG. 3 is a view similar to FIG. 2 after application of electric power to the electrodes to melt the solder and vaporize the insulation on the electrodes;

FIG. 4 depicts the soldered connection after power is disconnected from the electrodes;

FIG. 5 is a view similar to FIGS. 1–4 illustrating the preferred variation of the method depicted therein in which grooved electrodes are employed to straddle the wire and simultaneously contact the predeposit of solder and the wire;

FIG. 6 is a sectional view taken along lines 6—6 of FIG. 5; and

FIG. 7 is a view of the soldered connection after a pulse of electric power has been supplied to the electrodes.

A first specific approach to the reflow soldering method of this invention is illustrated in FIGS. 1–4. While many of the details of the process will be described in conjunction with these figures, reference should be had to FIGS. 5–7 and the accompanying description for the preferred approach to the method of this invention.

Referring to FIG. 1 there is shown therein a pair of parallel gap electrodes 10 which have been brought into contact with a strand of insulated wire 12 comprising a core of metallic conductor 14 surrounded by a circumscribing length of insulation 16. The relative thickness of insulation on the conductor is exaggerated for purposes of illustration. The strand 12, in turn, rests on a layer of solder 18 which is deposited on a printed circuit conductor 20. A convenient way of depositing solder on the conductor 20 is by means of electroplating. The printed circuit conductor 20 has been overlaid on a board such as a glass epoxy board 22.

The solder in this specific approach has a thickness which is slightly greater than the diameter of the insulated strand 12 for reasons which will become clearer subsequently. A point of attachment 24 located between electrodes 10 is the point at which it is desired to connect the strand of conductor 12 to the printed circuit conductor 20.

This is accomplished by first exerting pressure on the strand by means of electrodes 10 such that the portions of the strand directly beneath the electrodes are forced into the solder plating 18 until the insulation on strand 12 contacts the surface of the printed circuit conductor 20. As this is done contact is also established between the electrodes 10 and the solder plating 18 in the areas on each side of the line along which the strand is depressed into the solder. The length of strand between the two electrodes has a curved configuration imparted to it which is exaggerated in FIG. 2 for purposes of illustration.

The pressure exerted by the electrodes on the wire ranges between 30 and 150 ounces, with forces close to the lower limit being preferable.

In the next step electric power is supplied to the electrodes and current flows through an electric circuit established by the solder plating between the electrodes. FIG. 3 illustrates the results after current has flowed through the circuit thus established for approximately 40 milliseconds. The effect of the flow of current is to cause the solder between electrodes 10 to melt and to heat that portion of the strand 12 between the electrodes. The increase in temperature of the insulation is sufficient to cause it to vaporize, thereby exposing the bare metallic core 14 above the molten solder 20. Because of the heat sink effect of the electrodes and the solder in the areas removed from the point of attachment 24, the insulation directly beneath and exterior to the electrodes is not melted and remains intact.

By capillary action the molten solder is then caused to flow or "reflow" over the strand of conductor 14 until the entire length between the electrodes 10 is covered with solder providing a completed electrical circuit between the printed circuit conductor 20 and the metallic core 14. Typically, a 40 millisecond pulse of electrical power is sufficient to accomplish the preceding result. The exact duration of the pulse depends, among other factors, on the thickness of the wire to be soldered and the spacing of the electrodes relative to one another. Once the reflow connection has been made, the electrodes 10 are removed leaving a solder connection at the point of attachment 24 and portions of the conductor 12 buried in the solder plate. The workpiece is then moved until the next point of attachment of conductor to conductor is located beneath the electrodes and the electrodes are lowered into place to begin the process again.

In ordinary applications, it is contemplated that wire up to 4 mils in diameter is readily connectable by the specific steps outlined above. To accomplish a satisfactory result with this particular embodiment of the invention the thickness of the solder plating is preferably 0.5 mil thicker than the diameter of the insulated conductor to be soldered.

The relationship of electrode spacing, pulse duration and pulse energy are as follows. The spacing between the electrodes can be as small as 10 mils or as great as 125 mils without significant deterioration in result. A spacing of approximately 40 mils is preferred because this enables the use of a low-energy soldering pulse on the order of approximately 0.75 watt second while at the same time avoiding the possibility of blow outs. Pulse energies ranging from approximately 0.50 to 2.0 watt seconds are typically the amounts of power which are used. Pulse durations as short as 10 milliseconds and as long as 100 milliseconds can be used. The upper limit on pulse duration is determined by the point at which oxidation problems are encountered; the pulse has to be sufficiently fast to prevent oxidation of the solder joint before the solder recongeals. Specific values for these variables depend upon the particular application of the method and apparatus of this invention.

A variation on the specific soldering method described above and the preferred form of the method of this invention is illustrated in FIGS. 5, 6 and 7. Referring now to those figures, there is shown in FIG. 5 the relative position of a pair of electrodes 26, a strand of conductors 28 comprising a length of wire 30, and covering insulation 32. The wire is disposed in contact with a deposit of electroplated solder 34 which is overlaid on a printed circuit 36. As before, the printed circuit is disposed on a support such as a glass epoxy board 38.

In this embodiment the step of exerting pressure on the wire by means of the electrodes to force the conductor 28 into the solder is unnecessary since, by virtue of detents or grooves 40 located in an aligned relationship the bottom surface 42 of the electrodes, the electrodes contact both the strand 28 and the solder plate 34 simultaneously upon lowering of the electrodes into position.

To improve the thermal isolation of the wire segment and solder located between the electrodes, electrodes 26 are preferably fabricated from molybdenum and constructed such that the width of the electrodes measured along the dimension paralleling the longitudinal axis of the wire is approximately 5 to 10 mils thick. (See FIGS. 5 and 7.) In this way the head sink effect of the electrodes is reduced causing the solder-wire segment between the electrodes to remain hot for a longer period of time for given values of energy pulses. Such a configuration also prevents splatter or squashing of the solder deposit, reducing the possibility of short circuits to adjacent wires. Finally use of electrodes of this type means it is possible to use lower amplitude pulses thereby reducing the possibility of "blow-outs" at the points of electrode contact.

As before, power is supplied to the electrodes producing a current flow between the electrodes and essentially the same action as previously described takes place. The solder between the electrodes is melted and the heat of the molten solder and wire segment between the electrodes, due to the current flow in the circuit including the electrodes and solder causes the insulation on the conductor 28 to be vaporized laying bare the metallic wire 30 and setting the stage for capillary flow of the molten solder 34 over the surface of the wire 30. Thus the electrical connection between the wire 30 and the printed circuit 36 is completed. At the end of soldering pulse, current stops flowing in the circuit, allowing the solder to congeal leaving a solid electrical connection. The electrodes are then removed as before and the workpiece moved to dispose another point of connection beneath the electrodes.

In this embodiment, the parameters are somewhat different. It has been found that for wire strands up to 24 mils in diameter approximately a 1 mil thickness of solder plating on top of the printed copper or nickel conductor is sufficient to provide adequate solder for the reflow connection. The other parameters: electrode spacing, pulse duration, and pulse amplitude are again interdependent and vary as described above. The detents or grooved portions 40 provided in the electrodes have such a configuration that they are adapted to simultaneously contact the conductor and the solder. This, of necessity, may require the interchange of electrodes depending upon the diameter of the wire being used.

The preceding invention has been described in terms of the reflow solder connection of unstripped wires to a printed circuit board. While the application of this invention to such a specific purpose is definitely contemplated, it is not intended to be construed as limiting the scope of the invention to this particular application.

What is claimed is:

1. A method of soldering an insulated conductor to a workpiece comprising the steps of:
   (1) placing a portion of the conductor in contact with a portion of the workpiece to which the insulated conductor is to be bonded, said portion of the workpiece having a quantity of solder disposed thereon,
   (2) contacting the conductor and solder with a pair of electrodes spaced along the conductor on opposite sides of said portion of the workpiece, contact between the solder and electrodes completing an electric circuit therebetween,
   (3) applying electric power to the electrodes to cause a flow of electric current in the circuit between the electrodes, the flow of current causing heating and melting of the solder and vaporization of the insulation, and thereafter
   (4) discontinuing the application of power and removing the electrodes.

2. The method according to claim 1 where the pair of electrodes are parallel gap welding electrodes.

3. A method of soldering insulated wire to a workpiece comprising the steps of:
   (1) placing a portion of the insulated wire in contact with a portion of the workpiece to which the insulated wire is to be bonded, said portion of the workpiece having a quantity of solder disposed thereon,
   (2) contacting the wire with a pair of electrodes spaced along the wire on opposite sides of said portion of the workpiece,
   (3) exerting pressure on the wire by means of the electrodes to force the wire into the solder such that the electrodes contact the solder, contact between the solder and electrodes completing an electric circuit therebetween,
   (4) applying electric power to the electrodes to cause a flow of electric current in the circuit between the electrodes, the flow of current causing heating and melting of the solder, and vaporization of the insulation, and thereafter
   (5) discontinuing the application of power and removing the electrodes.

4. The method according to claim 3 wherein the thickness of the quantity of solder disposed on said portion of the workpiece is in excess of the diameter of the insulated wire.

5. The method according to claim 4 wherein the spaced electrodes are parallel gap welding electrodes and said portion of the workpiece is a portion of metal foil on a printed circuit board.

6. A method of soldering insulated wire to a workpiece comprising:
   (1) placing a portion of the insulated wire in contact with a portion of the workpiece to which the insulated wire is to be bonded, said portion of the workpiece having a quantity of solder disposed thereon,
   (2) contacting the wire and solder with a pair of electrodes spaced along the wire on opposite sides of said portion of the workpiece, the electrodes having a grooved portion in the surfaces thereof for engaging the wire such that the electrodes simultaneously contact the wire and solder, contact between the solder and electrodes completing an electric circuit therebetween,
   (3) applying electric power to the electrodes to cause a flow of electric current in the circuit between the electrodes, the flow of current causing heating and melting of the solder and vaporization of the insulation, and thereafter
   (4) discontinuing the application of power and removing the electrodes.

7. The method according to claim 6 wherein the pair of electrodes are parallel gap welding electrodes and said portion of the workpiece is a portion of metal foil on a printed circuit board.

8. A method of making an electrical connection between an insulated electrically conductive wire and a printed circuit board conductor by means of reflow soldering comprising the steps of:
   (1) depositing a quantity of solder on the printed circuit board conductor at a predetermined point of electrical connection,
   (2) placing the insulated conductor in contact with the deposited quantity of solder,
   (3) holding the conductor in place with respect to the point of connection with a pair of parallel gap welding electrodes, spaced along the wire on opposite sides of the point of connection, the electrodes also being adapted to contact the solder to complete an electric circuit therebetween,
   (4) applying electric power to the electrodes to cause a flow of electric current between the electrodes, the flow of current causing heating and melting of the solder and vaporization of that portion of the insulation on the wire between the electrodes exposing the conductive wire, and
   (5) allowing the melted solder to flow over the wire by capillary action to complete an electrical connection between the wire and the printed circuit board conductor,
   (6) discontinuing the application of electric power, and thereafter
   (7) removing the electrodes from contact with the wire and solder.

(References on following page)

References Cited

UNITED STATES PATENTS

| | | | |
|---|---|---|---|
| 1,613,957 | 1/1927 | Madden | 219—85 |
| 2,977,672 | 4/1961 | Telfer | 29—155.5 |
| 3,155,809 | 11/1964 | Griswold | 29—630 X |
| 3,156,514 | 11/1964 | Wing et al. | |
| 3,224,072 | 12/1965 | Summers et al. | 29—625 |
| 3,244,798 | 4/1966 | Warner | 219—78 X |
| 3,252,203 | 5/1966 | Alberts | 219—58 X |
| 3,263,059 | 7/1966 | Rzant | 219—56 X |
| 3,277,268 | 10/1966 | Williams et al. | 219—92 |
| 3,309,494 | 3/1967 | Hebert et al. | 219—85 |
| 3,337,711 | 8/1967 | Garscia | 219—92 |
| 3,350,536 | 10/1967 | Bush | 219—92 |
| 3,353,263 | 11/1967 | Helms | 219—78 X |

FOREIGN PATENTS

| | | |
|---|---|---|
| 548,002 | 4/1932 | Germany. |
| 856,820 | 11/1952 | Germany. |
| 697,396 | 9/1953 | Great Britain. |

OTHER REFERENCES

"Welding through an Insulator" I.B.M. Technical Disclosure Bulletin, vol. 8, No. 8, January 1966 by F. J. Bolda and E. J. Webb, pp. 1167.

RICHARD M. WOOD, *Primary Examiner.*

B. A. STEIN, *Assistant Examiner.*

U.S. Cl. X.R.

219—92, 117; 252—153